Aug. 16, 1938.    H. A. DEVINE ET AL    2,126,752
BRACING GUARD FOR MOTORCYCLES AND SIMILAR TWO-WHEELED VEHICLES
Filed July 12, 1937
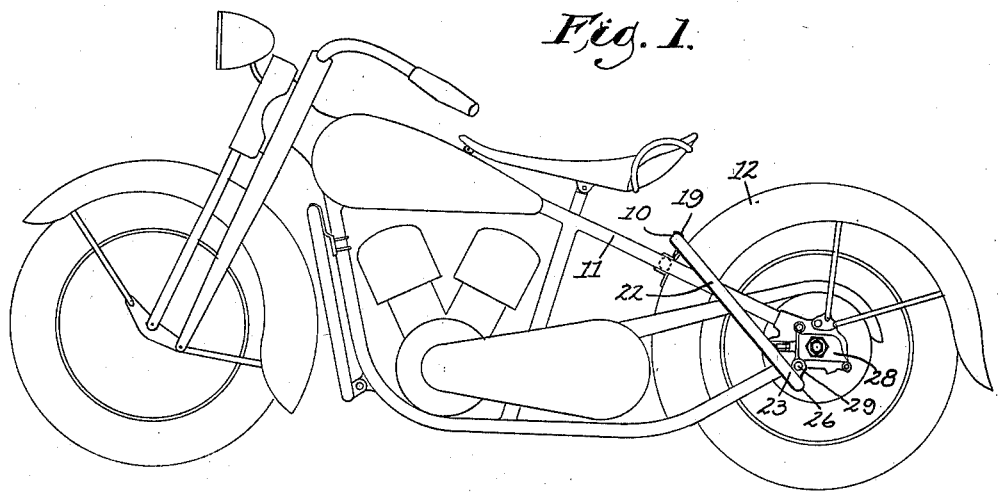
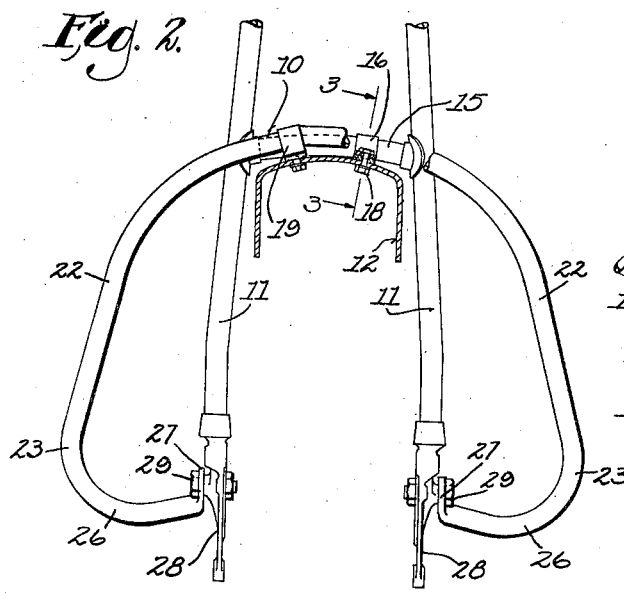
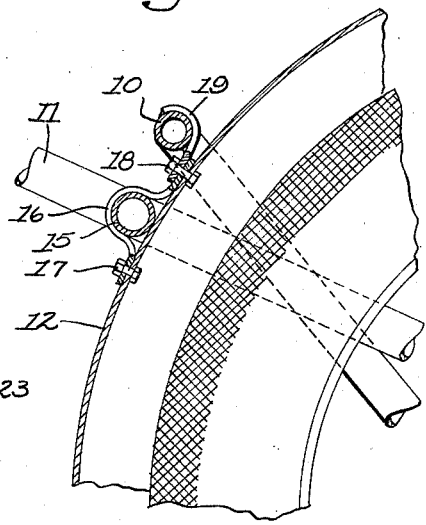
INVENTOR
HARRY A. DEVINE AND
FRANK M. MOLITOR
BY
Wheeler, Wheeler + Wheeler
ATTORNEYS Patented Aug. 16, 1938

2,126,752

UNITED STATES PATENT OFFICE 2,126,752

BRACING GUARD FOR MOTORCYCLES AND SIMILAR TWO-WHEELED VEHICLES

Harry A. Devine and Frank M. Mclitor, Milwaukee, Wis., assignors to Harley-Davidson Motor Company, Milwaukee, Wis., a corporation of Wisconsin Application July 12, 1937, Serial No. 153,106

1 Claim. (Cl. 280—289)

Our invention relates to improvements in bracing guards for motorcycles and similar two-wheeled vehicles.

The object of our invention is to provide increased protection for the rear wheel and associated portions of the frame of a motorcycle; also to provide for the protection of passengers riding tandem, and equipment, such as radio equipment, mounted upon the rear portion of the frame.

In a former patent, numbered 1,941,801, and dated January 2, 1934, for a Motorcycle protecting guard, means are provided for protecting the shins of the operator and for supporting the motor and the operator from the ground when the motorcycle is upset. Such guards have been very successful in protecting operators and also the forward and central parts of a motorcycle, but passengers have not been adequately protected and effective guards for the rear portion of the machine have not heretofore been provided because of various problems, including interference with mounting and dismounting, and for the further reason that guards heretofore attempted to be designed tended to render the motorcycle cumbrous and difficult to handle.

It is our object to provide a guarding attachment which can readily be secured to the frame of a motorcycle without redesigning the frame, and which will perform its functions without objectionably encumbering the machine or interfering with the mounting and dismounting of the operator or of passengers riding tandem upon an extended saddle.

It is also our object to provide a guarding attachment which will perform the further function of reenforcing the rear portion of a vehicle frame under ordinary conditions of use and varying conditions of load.

In the drawing:

Figure 1 illustrates, in side elevational outline, the wheels and frame of a motorcycle or bicycle to which our invention has been applied.

Figure 2 is a view in rear perspective, showing our invention in association with rear axle clips and portions of the upper rear frame fork of such a vehicle.

Figure 3 is a fragmentary view, partly in section, drawn to a plane indicated by line 3—3 of Figure 2.

Like parts are identified by the same reference characters throughout the several views.

A tubular guard bar of adequate size and strength for the described purposes is bent into the form of an arch, having a central portion 10 extending transversely across the space between the rear fork arms 11 and the rear wheel mud guard 12 in the vicinity of the cross brace 15 of the rear upper frame fork. At each side of the center of the cross brace 15 the mud guard supporting strap brackets 16,—preferably welded to the cross brace, not only have their ends connected with the mud guard by bolts 17 and 18, but the bolts 18 also connect them with auxiliary straps or brackets 19 which embrace the portion 10 of the guard bar and are preferably welded thereto.

At each side of its central portion 10 the guard bar extends downwardly, laterally and rearwardly in the form of divergent side arms 22 to provide a generally V-shaped guard for the rear wheel and any passenger who may be riding tandem. The lower end portions of these arms are curved inwardly at 23 and provided with upturned extremities 26 flattened at 27 and bolted to the rear axle clips 28 at 29.

The curved portions 23 form shock receiving supporting shoes, each of which is adapted to slide along the ground when the motorcycle is upset and prevent the wheel, associated parts of the frame, and equipment, from injury. When used in association with the forward leg guard disclosed in said former patent, both the operator and his passenger, if any, will ordinarily escape injury.

In addition to the foregoing advantages, our improved guard reenforces and braces against lateral and vertical strains the entire rear portion of the motorcycle, thus making it possible, if desired, to employ lighter frame members than can otherwise be safely employed.

The guard arms 22 are preferably formed integrally from a single bar having its central portion 10 secured to the frame, and these arms 22 are preferably connected to the frame in some manner in the vicinity of the upper fork arms 11. Also, the curved portions 23 of the guard are preferably located below the level of the axle 24 and are secured to the axle clips by bolts 29, which bolts may also serve to attach a side car when the guard is not in use. These preferred features or details of structure are, of course, subject to modification and adaptation to motorcycle and bicycle frames of various types.

We claim:

In combination with the rear forks, transverse brace arm and rear mud guard of a two-wheel vehicle of the motorcycle and bicycle type, of a guard for protecting the rear portions of the vehicle from destructive contact with the ground when the vehicle is upset while in motion, said guard including an arched central portion positioned above the brace arm and extending over the mud guard, means for connecting the central portion to the mud guard and the brace arm, said central portion having diverging downwardly extending arms, said arm being bent inwardly below the rear axle to form rounded shoes, and means for connecting the inwardly extending portions of said arms to the rear forks below the rear axle.

HARRY A. DEVINE.
FRANK M. MOLITOR.